United States Patent [19]

Aquila

[11] 4,088,303

[45] May 9, 1978

[54] LIFT FOR SMALL VEHICLES

[76] Inventor: Joseph Aquila, 144-41 231st St., Rosedale, N.Y. 11422

[21] Appl. No.: 785,860

[22] Filed: Apr. 8, 1977

[51] Int. Cl.² .................................................. B60P 1/16

[52] U.S. Cl. .......................................... 254/88; 254/124

[58] Field of Search .................... 254/124, 88, 91, 8 R, 254/8 B, 8 C, 2 R, 2 B, 2 C; 187/8.47

[56] References Cited

U.S. PATENT DOCUMENTS

| | | | |
|---|---|---|---|
| 3,759,488 | 9/1973 | Lukas | 254/8 R |
| 3,863,890 | 2/1975 | Ruffing | 254/88 |

*Primary Examiner*—Robert C. Watson

*Attorney, Agent, or Firm*—Ostrolenk, Faber, Gerb & Soffen

[57] ABSTRACT

Repositionable lift apparatus is constructed of a boom pivoted at one end near the upper end of a post. The other end of the boom pivotally supports a platform and a power cylinder is provided to pivot the boom to raise its other end from a loading position to a working position. In the loading position of the boom one end of the platform is a grade so that a vehicle may be rolled thereon. In the working position of the boom a stop means on the platform engages the boom to position the platform in a raised generally horizontal position. A manually operated winch is provided on the boom to load a vehicle on to the platform and a safety means automatically positions itself to block sudden collapse of the power cylinder arm.

12 Claims, 8 Drawing Figures

FIG. 5
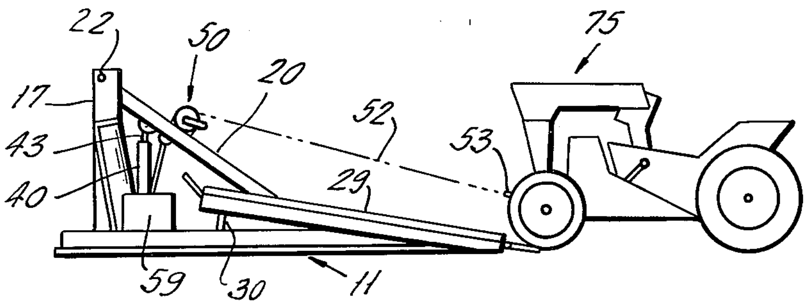
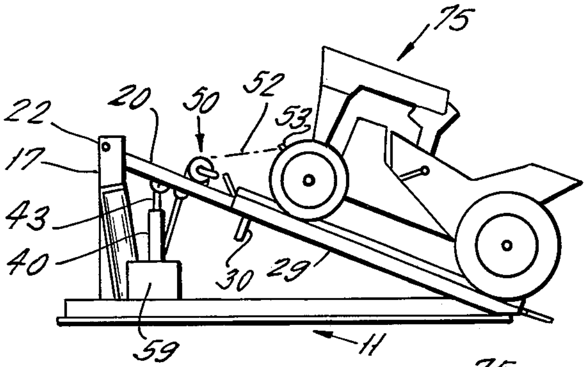
FIG. 6
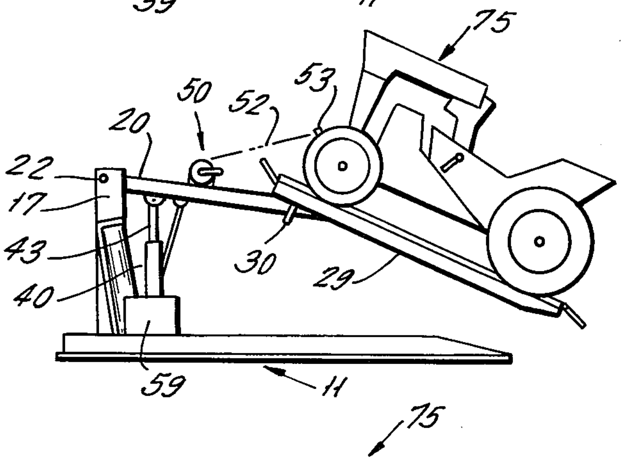
FIG. 7
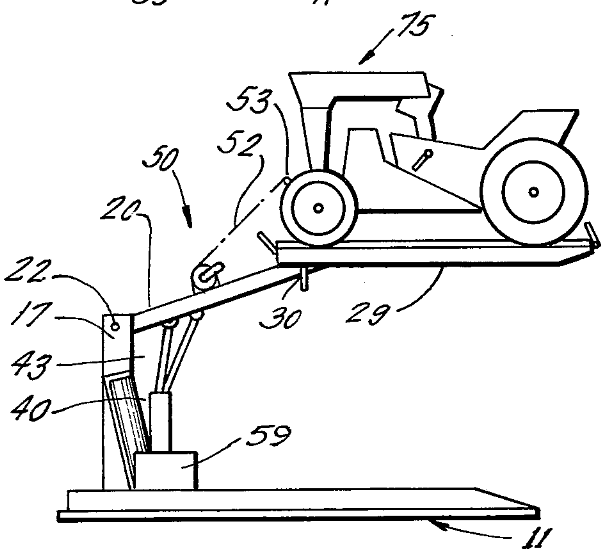
FIG. 8

LIFT FOR SMALL VEHICLES

This invention relates to lifts in general and more particularly relates to a relatively compact inexpensive lift that may be moved very readily and does not require a special working site.

For the most part, lifts used by mechanics for conveniently positioning motor vehicles so that they may be serviced and/or repaired comprise fixed installation wherein a hydraulic operating means is disposed below grade. This operating means acts directly on a vehicle supporting platform to raise and lower the platform while it is maintained in a generally horizontal position. Lifts of this type are very expensive and are dangerous and/or inconvenient for one man to load.

In contrast, the instant invention provides a movable lift apparatus adapted particularly for use with relatively light vehicles such as lawn mower tractors. In accordance with the instant invention such lift apparatus includes a base having an upwardly extending post which supports one end of a boom on a horizontal pivot. The other end of the boom is connected by a second horizontal pivot to a platform means constructed of spaced parallel tracks. A fluid operated power cylinder is used to raise the end of the boom connected to the platform means and in so doing the platform means is raised from a loading position in contact with the ground to a working position wherein the platform means is substantially above the ground. A hand operated winch mounted on the boom is provided for drawing a vehicle onto the tracks of the platform means and for holding the vehicle during servicing thereof.

Accordingly, a primary object of the instant invention is to provide a novel construction for a lift means.

Another object is to provide lift means that is conveniently movable to different locations.

Still another object is to provide lift means of this type that is relatively inexpensive and is simple for one man to operate.

A further object is to provide a lift apparatus of this type which includes a single pivoted boom.

These objects as well as other objects of this invention shall become readily apparent after reading the following description of the accompanying drawings in which:

FIGS. 5 through 8 are side elevations similar to FIG. 1 showing the relative positions of main elements of the lift apparatus as the boom is raised from its loading position of FIG. 5 to its working position of FIG. 8.

Figure 1:
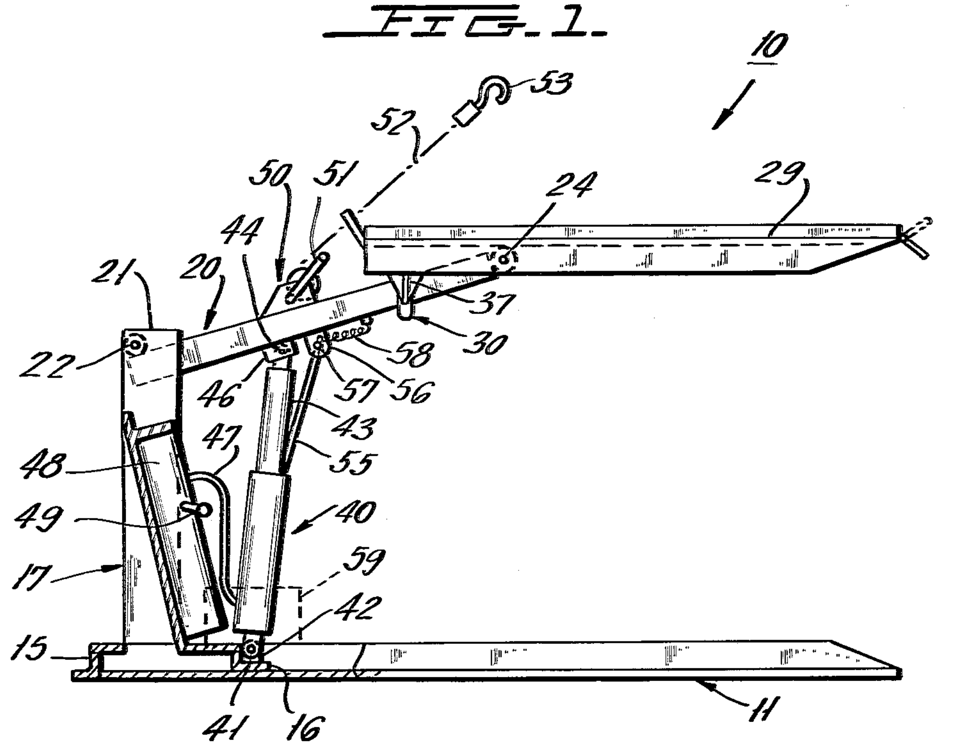
FIG. 1 is a side elevation of vehicle lift apparatus constructed in accordance with the instant invention.
Figure 2:
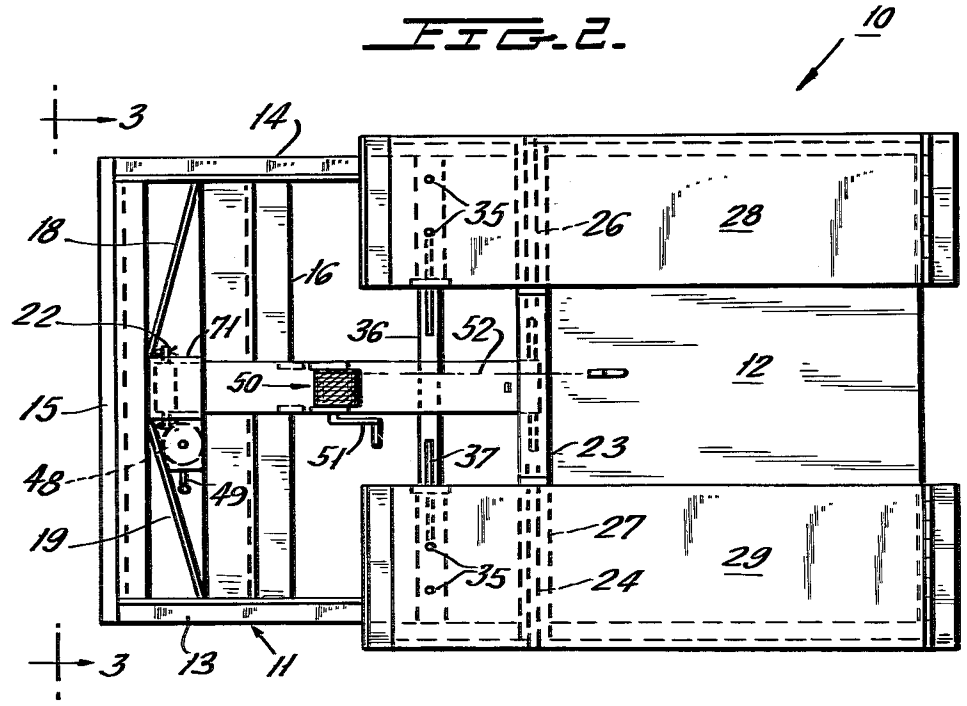
FIG. 2 is a plan view of the lift apparatus of FIG. 1.

Now referring to the Figures. Lift apparatus 10 includes base 11 constructed of rectangular metal sheet 12 having angle irons 13 and 14 along the long edges thereof and transverse angle iron 15 along the front short edge thereof. Another transverse angle iron 16 disposed on the upper surface of plate 12, is positioned parallel to angle 15 and slightly to the rear thereof. Post 17, of U-shaped cross-section, extends upward from base 11, is positioned midway between angle irons 13, 14 and adjacent to transverse member 15. Triangular sheet metal pieces 18, 19 connected between base 11 and the sides of post 17 serve to stabilize post 17.

Longitudinally extending hollow boom 20 is provided at its front end with sleeve 21. Pin 22 extends through aligned apertures in the sides of post 17 near its upper end and through sleeve 21 to pivotally connect the front of boom 20 to post 17. The rear of boom 20 is provided with sleeve 23 which is transverse to the length of boom 20 and extends beyond both ends thereof. Pivot rod 24 extends through sleeve 23 as well as through axially aligned sleeves 26, 27 welded to the undersides of the respective tracks 28, 29. The latter constitute a platform means. For a reason which will hereinafter be seen, pivot rod 24 is located substantially forward of the center of tracks 28, 29.

A stop means is provided by generally U-shaped tubular member 30. Arms 31, 32 of member 30 are provided with outward extensions 33, 34 which are adjacent to the undersides of tracks 28, 29 being secured thereto by bolts 35. Web portion 36 of stop member 30 extends below boom 20 so as to be engageable therewith for a reason which will hereinafter be explained. Triangle-like stiffness 37 stabilizes the positions of adjacent bent portions of stop means 30.

Pin 41 extends through aligned apertures in a pair of uprights 42 on angle iron 16 to pivotally connect the lower end of fluid operated power cylinder 40 to base 11. Extendable operating arm or rod 43 of power cylinder 40 is pivotally connected at its free upper end to boom 20 at a point intermediate the ends thereof. This connection is made by pivot pin 44 which extends through aligned apertures in C-shaped bracket 46 secured to the underside of boom 20. Flexible line 47 connects power cylinder 40 to pump-reservoir unit 48 having manually operable control 49.

Winch 50, secured to the upper surface of boom 20 intermediate the ends thereof, is provided with manually operable crank 51 and cable 52 having hook 53 at the free end thereof.

Figure 4:
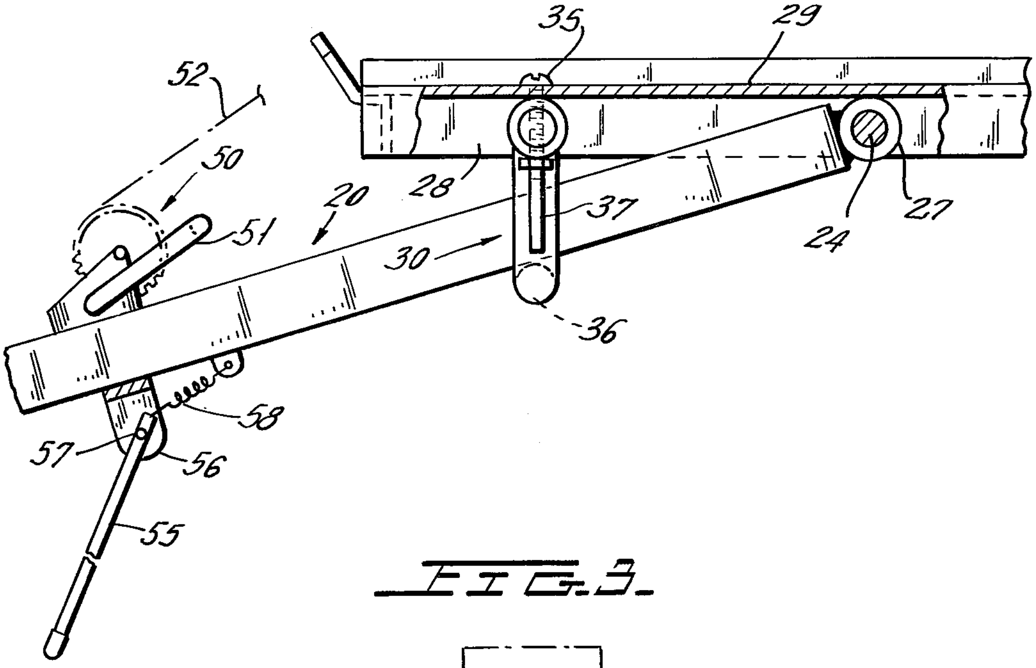
FIG. 4 is a fragmentary side elevation looking in the direction of arrows 4—4 of FIG. 3.

Lift apparatus 10 also includes safety lever 55 pivotally mounted to C-shaped bracket 56 on boom 20 by means of pin 57. Tension spring 58, connected between boom 20 and a portion of lever 55 extending above pivot 57, biases lever 55 clockwise with respect to FIG. 4 toward a blocking position for a reason which will hereinafter become evident.

The rectangle indicated by reference numeral 59 is the location for a battery when pump-reservoir unit 48 is designed for DC low voltage operation.

Figure 3:
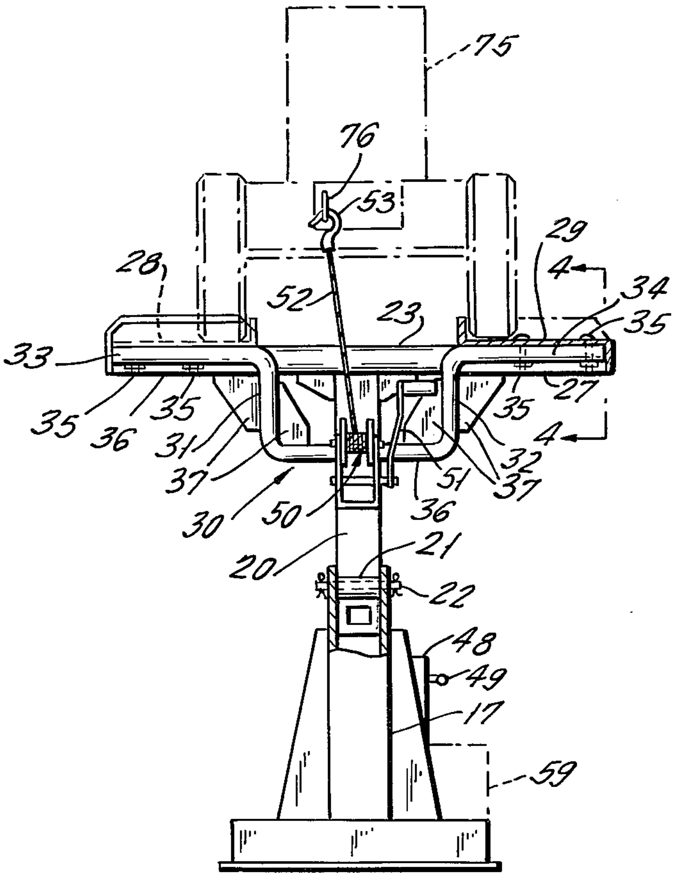
FIG. 3 is an end view of the lift apparatus looking in the direction or arrows 3—3 of FIG. 2.

The operation of lift 10 is best seen by reference to FIGS. 5 through 8. More particularly, in FIG. 5 power cylinder arm 43 is retracted so that the rear of boom 20 is lowered to a so-called loading position wherein the rear of tracks 28, 29 rest upon the surface supporting platform 11. In this position tracks 28, 29 are slanted slightly upward from rear to front. Winch cable 52 is withdrawn from the drum of winch unit 50 and cable hook 53 is made to engage the front of tractor 75 at eye 76 (FIG. 3). Winch 50 is then operated to draw tractor 75 onto tracks 28, 29 and after the rear wheels of tractor 75 are on tracks 28, 29 the drum of winch 50 is locked against rotation.

Handle 49 is then operated so that unit 48 pumps fluid into power cylinder 40. This extends arm 43 thereby raising the rear end of boom 20 until it reaches the working position of FIG. 8. As boom 20 starts its movement from the position of FIG. 5 to that of FIG. 8, the angle between tracks 28, 29 and base 11 increases in that tracks 28, 29 are free to pivot clockwise about pivot 24 which connects the rear of boom 20 to tracks 28, 29. However, by the time boom 20 has reached an almost horizontal position (FIG. 7) stop means 30 engages boom 20 thereby limiting further pivoting of tracks 28, 29 relative to boom 20 as the rear of the latter continues to move upward to the working position of FIG. 8. In this latter position tracks 28, 29 are almost in a horizontal position but, nevertheless, are still at a slight angle with respect to the horizontal. That is, the rear of tracks 28, 29 are slightly below the fronts thereof and are naturally biased to this position by gravity whether or not there is a normal load on tracks 28, 29.

Platform 28, 29 is lowered to the loading position of FIG. 5 by reversing the proceedures set forth in the two preceding paragraphs.

Although a preferred embodiment of this invention has been described, many variations and modifications will now be apparent to those skilled in the art, and it is therefore preferred that the instant invention be limited not by the specific disclosure herein but only by the appended claims.

What is claimed is:

1. Lift apparatus for supporting a vehicle in raised position, said apparatus including a base, platform means, a boom, first pivot means connecting said boom at its front end to said base and second pivot means connecting said boom at its rear end to said platform means at a position wherein the rear of said platform is biased downwardly by gravity, power means selectively operable to move said boom about said first pivot means to raise said rear end of said boom from a loading position to a working position, said rear of said platform means being generally at the level of said base when said boom is in said loading position and being substantially above the level of said base when said boom is in said working position, and stop means operative with said boom in said working position to limit downward movement of the rear of the platform means to a position convenient for working on a vehicle supported by said platform means.

2. Lift apparatus as set forth in claim 1 also including a winch mounted on said boom for pulling a vehicle on to said platform means when the boom is in the loading position.

3. Lift apparatus as set forth in claim 1 also including post means extending upward from the base, said first pivot means being on said post means and being positioned above the second pivot means when the boom is in the loading position.

4. Lift apparatus as set forth in claim 3 in which the first pivot means is below the second pivot means when the boom is in the working position.

5. Lift apparatus as set forth in claim 1 in which during movement of the boom toward the working position the angle between the platform means and the base increases until the boom reaches a first position wherein the stop means becomes effective to establish a predetermined angular relationship between the platform means and the boom, and as said boom moves from the first position to the working position the angle between the platform means and the base decreases.

6. Lift apparatus as set forth in claim 1 in which the power means comprises a fluid operated power cylinder acting on the boom from below.

7. Lift apparatus as set forth in claim 6 also including a safety device biased to a holding position relative to said power cylinder wherein with said boom in said working position said safety device is positioned automatically to block retraction of the power cylinder working arm.

8. Lift apparatus as set forth in claim 4 in which the platform means comprises a pair of longitudinally extending spaced parallel tracks, said first and second pivot means defining pivot axes transverse to the lengths of said tracks and said boom, said boom when in said loading position extending between said tracks.

9. Lift apparatus as set forth in claim 8 in which the stop means comprises a generally U-shaped section having arms secured to opposite ones of said tracks, said arms at their ends remote from said tracks being connected by a web extending below the boom and engageable therewith means for limiting downward movement at the rear end of the platform means when the boom is in said working position.

10. Lift apparatus as set forth in claim 9 in which during movement of the boom toward the working position the angle between the platform means and the base increases until the boom reaches a first position wherein the stop means becomes effective to establish a predetermined angular relationship between the platform means and the boom, and as said boom moves from the first position to the working position the angle between the platform means and the base decreases.

11. Lift apparatus as set forth in claim 10 in which the power means comprises a fluid operated power cylinder acting on the boom from below.

12. Lift apparatus as set forth in claim 11 also including a winch mounted on said boom for pulling a vehicle on to said platform means when the boom is in the loading position.

* * * * *